(12) United States Patent
Karayilmaz

(10) Patent No.: US 12,487,031 B2
(45) Date of Patent: Dec. 2, 2025

(54) WASTE THERMAL ENERGY RECOVERY DEVICE

(71) Applicant: Özgür Karayilmaz, Karşiyaka/Izmir (TR)

(72) Inventor: Özgür Karayilmaz, Karşiyaka/Izmir (TR)

( * ) Notice: Subject to any disclaimer, the term of this patent is extended or adjusted under 35 U.S.C. 154(b) by 0 days.

(21) Appl. No.: 18/692,891

(22) PCT Filed: Sep. 16, 2021

(86) PCT No.: PCT/TR2021/050954
§ 371 (c)(1),
(2) Date: Mar. 18, 2024

(87) PCT Pub. No.: WO2023/043388
PCT Pub. Date: Mar. 23, 2023

(65) Prior Publication Data
US 2025/0137726 A1    May 1, 2025

(51) Int. Cl.
F27D 17/17    (2025.01)

(52) U.S. Cl.
CPC ................... F27D 17/17 (2025.01)

(58) Field of Classification Search
CPC ...... F27D 17/17; F27D 17/10; F28D 21/0005; F28D 7/106; F28B 37/40; F28F 2270/00
USPC ...................................... 165/109.1
See application file for complete search history.

(56) References Cited

U.S. PATENT DOCUMENTS

| | | | | |
|---|---|---|---|---|
| 4,546,818 A | * | 10/1985 | Nussbaum | F24D 11/002 165/47 |
| 9,217,609 B2 | * | 12/2015 | Fahrenbruck | B01J 12/005 |
| 9,651,310 B2 | * | 5/2017 | Garcia | E03C 1/00 |
| 10,447,200 B1 | * | 10/2019 | Fakih | H02S 40/34 |

(Continued)

FOREIGN PATENT DOCUMENTS

| | | |
|---|---|---|
| CN | 202884954 U | 4/2013 |
| CN | 103292605 A | 9/2013 |

(Continued)

OTHER PUBLICATIONS

International Search Report for corresponding PCT/TR2021/050954 dated Jun. 16, 2023.

(Continued)

*Primary Examiner* — Jon T. Schermerhorn, Jr.
(74) *Attorney, Agent, or Firm* — Egbert, McDaniel & Swartz, PLLC

(57) ABSTRACT

Disclosed is a waste thermal energy recovery device for optimizing machine, equipment and system efficiency by reducing energy released to the environment. A most outer heat insulation layer directs heat leakages to heat transfer chambers, functions as the last layer of heat transfer by circulating fresh air entering through the fresh air inlets, has an air flow space with the heat recovery outlet chamber, and a chimney outlet. A heat recovery outlet supplies fresh air with the heat recovered. A waste heat recovery inlet for waste fluid has thermal energy coming from the discharge fan of the machine or equipment to which the device is connected. An adapter cap provides adaptation of the device to the heat recovery outlet of the machine or equipment, insulates the fresh air inlets from the environment thermally, and provides that the fresh air inlet is made from the heat recovery outlet.

18 Claims, 5 Drawing Sheets

(56) References Cited

U.S. PATENT DOCUMENTS

| | | | | |
|---|---|---|---|---|
| 10,854,344 B2 * | 12/2020 | Singh | ...................... | G21C 15/22 |
| 11,318,420 B1 * | 5/2022 | Peek | ........................ | C02F 1/447 |
| 11,448,465 B2 * | 9/2022 | Yoshihara | ................ | F28D 7/103 |
| 2013/0206376 A1 * | 8/2013 | Shikazono | ............ | F28D 1/0316 |
| | | | | 165/172 |
| 2014/0311709 A1 * | 10/2014 | Chan | .......................... | F28D 7/12 |
| | | | | 165/104.11 |
| 2021/0310654 A1 * | 10/2021 | Jo | ........................... | F23J 15/003 |

FOREIGN PATENT DOCUMENTS

| | | | |
|---|---|---|---|
| CN | 108165686 A | | 6/2018 |
| CN | 209570011 U | | 11/2019 |
| CN | 111637727 A | | 9/2020 |
| DE | 2803403 A1 | | 8/1979 |
| JP | 09126665 A | * | 10/1995 |
| JP | H09126665 A | | 5/1997 |
| KR | 20030034868 A | | 5/2003 |
| KR | 20120057115 A | | 6/2012 |
| WO | WO-2021018030 A1 * | 2/2021 | ............. F27D 17/10 |

OTHER PUBLICATIONS

Written Opinion of the International Searching Authority for corresponding PCT/TR2021/050954 dated Jun. 16, 2023.

* cited by examiner

WASTE THERMAL ENERGY RECOVERY DEVICE

THE FIELD OF THE INVENTION

Invention relates to an advanced waste thermal energy recovery device comprising a control system supporting energy efficiency, designed to optimize machine, equipment and system efficiency by reducing energy release to environment in order to provide waste thermal energy recovery to steam boilers performing operations such as heating, drying, fluid phase change by energy transformation, fresh fruit-vegetable drying machines, air conditioning chambers performing air fresh operations, laundry drying machines, textile drying machines, machines and systems performing air or derivative gas and heat release to environment as a result of process.

BACKGROUND OF THE INVENTION

Upon day by day fast development of industry, damages caused to environment by wastes occurring as a result of production and consumption activities are increasing day by day. One of the most important effects of such damages is, no doubt, climate changes caused by to greenhouse gas. Atmosphere is polluted by flue gases released into environment as a result of combustion and consumption of hydrocarbon and high carbon containing fossil fuel-oils such as coal, petroleum and natural gas, and also said gases have negative impacts on climate when combined with thermal energy. Within frame of measures to be taken to prevent environmental pollution, it is needed to use environment-friendly energy sources and reduce use of fossil fuel sources as much as possible. Reduction of use of fossil fuel oil is possible by optimizing efficiencies of industrial activities firstly, minimizing effects of loss and thus increase energy efficiency.

Nowadays in the simplest application method preferred for recovery, heat energy produced as a result of an operation performed by use of heat energy and air or other exhaust gases having water evaporation are discharged directly into atmosphere by a simple chimney. This application having the highest energy loss and thus environment pollution is a directly simple chimney application. Most of systems designed to provide recovery perform heat transfer function for recovery purpose by use of heat exchangers providing fluid transfer through a pump in various types. Loss arising from energy need of transfer pump in transfer pump heat exchangers, heat loss occurring in the installation and loss caused by heat transmission capacity of materials used therein are some of factors limiting efficiency. In addition to factors limiting efficiency, use of transfer pump heat exchanger causes additional failures and maintenance cost for machine or system due to reasons such as failure to perform heat transfer due to disconnection caused by transfer fluid or failure of pump to work arising out of transfer pump. Another application providing recovery is energy gaining systems where recovery is provided by means of exchange of air entering system after mixing a part of discharge air or gas with fresh air entering system. In the systems where discharge air or gas is directly used for recovery purpose, efficiency is limited because inlet air develops water evaporation and gas content due to discharge air or gas, and pollution of inlet air occurs subject to rate of mixture.

Fresh air used during subjecting fuel-oils to combustion reaction is essential to have a characteristic of having high thermal energy and not containing water evaporation and other components negatively affecting combustion reaction. When recovery operation is considered in terms of air entering dryer, similarly drying air should have high thermal energy and water evaporation as little as possible and a fresh characteristic. The most important factor causing heat loss in chimney systems and affecting recovery efficiency considerably is cross-sectional speed distribution of fluid linearly flowing inside chimney is higher in comparison to chimney wall thickness in chimney center due to lack of friction effect occurring around chimney wall thickness. Fluid having thermal energy at high speed in chimney center tends to leave chimney at a higher speed in comparison to chimney wall thickness without contacting chimney wall. In such way when a metal chimney designed for purpose of increasing heat transmission is considered, thermal permeability coefficient of metal surface and thermal permeability coefficient of waste gas or air have a very high difference. This case means that chimney metal wall thermally permeability capability is highly above thermal transfer capability of waste gas molecules. In such case heat transfer efficiency of fluid flowing at a relatively higher speed towards chimney wall in comparison to chimney center is considerably low. In other words, besides too low thermal conductivity of waste gas, effect of high fluid speed at chimney center results in heat loss too.

Until now several studies have been made to provide effective recovery and new systems have been developed. One of them is the invention disclosed under patent application numbered DE2803403 (A1). Waste gas recovery device for free staying domestic boilers disclosed under the invention is a double case comprising of double-wall pipe length and/or chimney coating between furnace outlet and chimney. Double wall thickness is adequate to stand against city water pressure. Inner walls are of material durable against corrosion. Material covering chimney is corrugated or nervure material. Water inlet into occurring spaces is at the lower part of pipe with outlet on the top. Double pipe has outer covering.

Another study is the invention disclosed under patent application numbered KR20030034868 (A). The invention provides a boiler for recovery of waste heat and comprising a pin pipe, a pin pipe sliding guide for sliding pin pipe support from placement hole smoothly, and thus limitation of pin pipe by support during vibration and thermal transformation is prevented. A support frame supports a cap. A pin pipe absorbs heat from burnt gas. A support supports pin pipe. Cap collects burnt gas flowing from pin pipe. Sliding guide slides pin pipe in axial direction. Sliding guide comprises two semi-cylindrical sliding guides and fixed onto pin pipe by fixing bolts and inserted into spiral holes together with connection bolts and then placed into connection holes.

Another study is the invention disclosed under patent application numbered KR20120057115 (A). A pin pipe support device of HRSG (Heat Recovery Steam Generator) chamber of vibration free type minimizes vibration easily in order to prevent damage to a fixed pipe and a pin due to over-vibration. A pipe support device of an HRSG vibration free with fixed deviation plate comprises a primary module, a secondary module, an upper support and a lower support. Primary and secondary modules are provided at exhaust inlet of a boiler. The space between upper/lower support and fixed pipe is limited to 0.5 mm. Outer perimeter of upper and lower supports is connected to a main wall board and thus connected by means of a bushing. Bushing is inserted into end of vibration free chamber in the front.

Another study is an invention disclosed under utility model application numbered CN202884954 (U). The invention discloses a chimney waste heat recovery boiler unit comprising a chimney connected to smoke outlet of a boiler, a pipe bushed to outside of chimney, an air inlet channel formed between chimney and bushing pipe. Boiler is in contact with an air inlet and a fan supply air is designed to boiler in air inlet channel, multiple number of wind deflectors are provided in air inlet channel to provide formation of multiple number of separation spaces. Wind deflectors decrease increasing speed of hot air in air inlet channel considerably, heat protection in air inlet channel separation spaces is provided, heat loss is reduced and use rate of smoke waste heat is improved; parts diffusing outer heat in chimney and parts diffusing inner heat in the chimney absorb smoke heat distributed into air inlet channel more to heat fresh air, heat is taken into combustion chamber again, heat loss is taken, is reduced when smoke is finished, smoke waste heat is fully used and fuel consumption reduces.

Another study is the invention disclosed under patent application numbered CN111637727 (A). The invention a heat pump drying system with high efficiency and energy saving. Heat pump drying system with high efficiency and energy saving comprises a grain lifting part, a drying part, a transfer part and a heat pump part wherein it comprises a supporting part, a supporting lower part, a support cylinder and a grain adding hopper. Heat pump drying system with high efficiency and energy saving is characterized by a simple structure, no pollution, high level of automation, high energy use rate and high grain drying efficiency.

As a result, the need for a waste thermal energy recovery device eliminating the disadvantages available in the related art and inadequacy of existing solutions has necessitated development in the related art.

BRIEF DESCRIPTION OF THE INVENTION

Present invention relates to an advanced waste thermal energy recovery device comprising a control system supporting energy efficiency, designed to optimize machine, equipment and system efficiency by reducing energy release to environment in order to provide waste thermal energy recovery to steam boilers performing operations such as heating, drying, fluid phase change by energy transformation, fresh fruit-vegetable drying machines, air conditioning chambers performing air fresh operations, laundry drying machines, textile drying machines, machines and systems performing air or derivative gas and heat release to environment as a result of process, which meets above mentioned requirements, eliminates all disadvantages and brings some advantages.

From the related art, purpose of the invention is to provide energy efficiency, reduction of energy input, and therefore fuel oil consumption by means of recovery of thermal energy waste flue gasses occurring after burning fossil fuel oil and processing thereof or waste air flow containing dry or water evaporation having heat capacity and in waste environment air acclimatized before after discharge during air freshing operation at acclimatization plants by means of waste thermal recovery device developed hereunder.

Purpose of the invention is to provide discharge of thermal energy carrying fluid transferred by help of chimney fan in simple chimney system from chimney entrance into chimney and chimney exit by following a linear path and realization of heat transfer from chimney inner surface area to outer environment perpendicular to flow direction of fluid.

Another purpose of the invention is to scan inner surface of chimney by fluid thanks to chimney structure of waste thermal energy recovery device, circular movement thereof inside chimney and thus increasing efficiency of thermal energy transferred from chimney inner surface.

A further purpose of the invention is to provide the fluid velocity is low in the chimney center, unlike the simple chimney, considering the linear velocities in the chimney direction, the fluid velocity on the inner wall of the chimney is higher than the center of the chimney, low linear fluid velocity in the chimney direction in the chimney center and the flow density at the chimney walls by help of scanning fully chimney surface area by fluid by effect of efficiency increase circular characterized centrifugal effect and long way to be taken by fluid inside chimney.

Another purpose of the invention is to provide increase of fluid contact surface area of recovery heat transfer capability perpendicular to fluid motion direction by help of materials with high heat permeability coefficient such as aluminium, copper and similar materials of surface material and thin material as much as possible in terms of material thickness.

A further purpose of the invention is to make longer adequately the path taken by fluid inside waste thermal energy recovery device by scanning fluid inner wall during worktime without negative impact of flow rate by help of selecting inner transfer chamber diameter and height in a manner to maximize efficiency.

Another purpose of the invention is to provide increase of machines, equipment and systems efficiency as it can be part of a machine, equipment or system by help of waste thermal energy recovery device as well as connection to machine, equipment or systems in use by heat insulated fixed lines or in case of moving part of machine, equipment or system by connection by heat insulated flexible hoses.

A further purpose of the invention is to provide a novelty nature in terms of applicability by help of flexible use of waste thermal energy recovery device.

The structural and characteristics features of the invention and all advantages will be understood better in detailed descriptions with the figures given below and with reference to the figures, and therefore, the assessment should be made taking into account the said figures and detailed explanations.

BRIEF DESCRIPTION OF FIGURES

In order to make the embodiment and additional members being subject of the present invention as well as the advantages clearer for better understanding, it should be assessed with reference to the fallowing described figures.

REFERENCE NUMBERS

Figure 1:
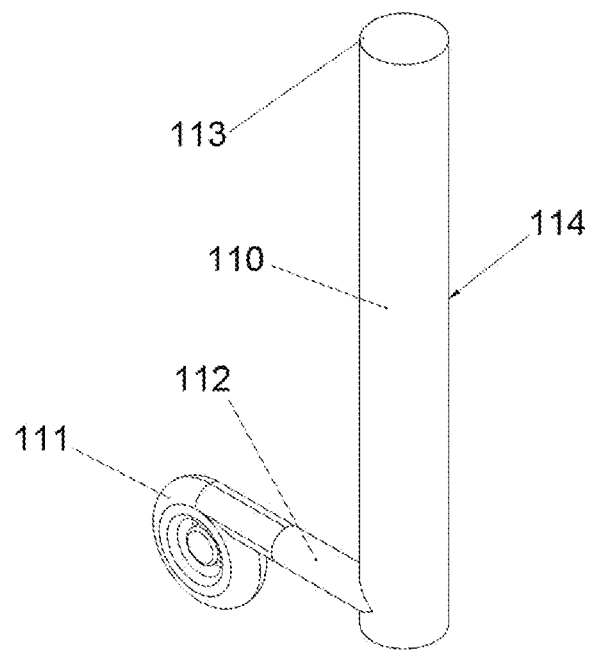
FIG. 1 is schematic general view of chimney system of waste thermal energy recovery device.

100. Waste thermal recovery device
110. Chimney
111. Chimney fan
112. Chimney inlet
113. Chimney outlet
114. Heat recovery transfer surface
115. Fluid directing spiral helix
120. Heat insulation layer
121. Fresh air inlet channel
130. Heat recovery outlet
131. Heat recovery outlet chamber
132. Outer transfer inlet
140. Heat recovery inlet
141. Inner transfer chamber
142. Inner transfer inlet
143. Last transfer chamber pass
144. Last transfer surface
145. Last transfer chamber
146. Outer transfer chamber fluid directing spiral helix
147. Inner transfer outlet channels
148. inner transfer chamber fluid directing spiral helix
149. Inner transfer outlet
150. Inner transfer chamber inner layer
151. Inner transfer fluid directing spiral helix
160. Adapter cap
161. Adapter cap inlet pipe
170. Outlet connection hose
180. Inlet connection hose
A. Textile drying machine
A1. Loading door
A2. Exhaust outlet

DETAILED DESCRIPTION OF THE INVENTION

In this detailed description an advanced waste thermal energy recovery device (100) comprising a control system supporting energy efficiency, designed to optimize machine, equipment and system efficiency by reducing energy release to environment in order to provide waste thermal energy recovery to steam boilers performing operations such as heating, drying, fluid phase change by energy transformation, fresh fruit-vegetable drying machines, air conditioning chambers performing air fresh operations, laundry drying machines, textile drying machines, machines and systems performing air or derivative gas and heat release to environment as a result of process is described only for better understanding of the invention for illustrative purpose and without any restriction.

In a simple chimney system design of waste thermal energy recovery device (100) of the invention, thermal energy carrying fluid transferred via chimney fan (111) passes through chimney inlet (112) and follows a linear path towards chimney outlet (113) through chimney (110) and is discharged from chimney outlet (113). Transfer of heat from chimney (110) inner surface area perpendicular to fluid flowing towards outer environment is provided. Waste thermal energy recovery device (100) of the invention in principle aims to recover the energy transferred via chimney (110) surface area by increasing energy efficiency. "For this purpose, as shown in FIG. 1, waste thermal energy recovery device (100) in an embodiment forms a turbulence current of circular characteristics scanning inner surface of chimney (110) in a tangential way continuously upon passing of thermal energy carrying fluid transferred via chimney fan (111) through chimney inlet (112) through chimney (110) towards to chimney outlet."

Figure 2:
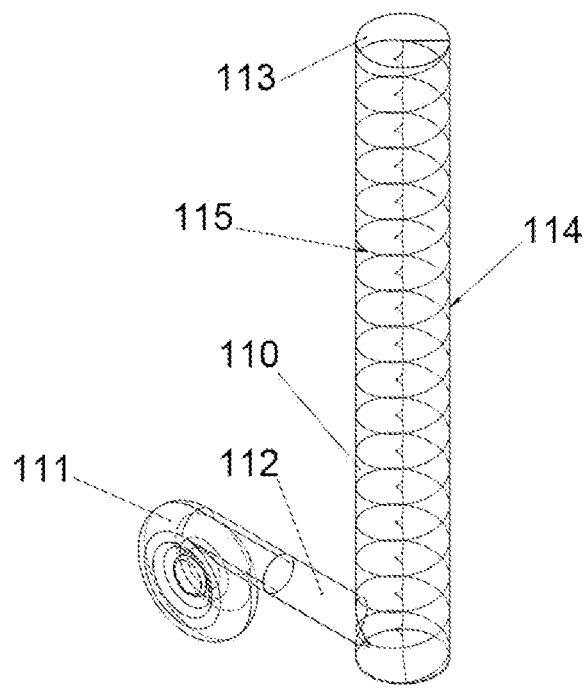
FIG. 2 is cross-sectional schematic general view of chimney system of waste thermal energy recovery device.

As shown in FIG. 2, waste thermal energy recovery device (100) in an embodiment, a turbulence current of circular characteristics guided by help of fluid directing spiral helix (115) inside chimney (110) upon passing of thermal energy carrying fluid transferred via chimney fan (111) through chimney inlet (112) and through chimney (110) and in a tangential way to chimney inner surface is created. In principle, circular movement for fluid in chimney (110) by scanning inner surface as shown in FIG. 1 and FIG. 2 provides increase of transfer efficiency of thermal energy transferred from inner surface. Efficiency increase occurs as a result of scanning of entire chimney (110) surface area by fluid under centrifugal effect and path of fluid taken in chimney (10) getting longer. In this case, contrary to simple chimney (110), when linear speeds in chimney (110) direction are taken into account, fluid speed at chimney (110) center is low and fluid speed in inner wall of chimney (110) is high in comparison to chimney centre. Low speed of linear flowing in chimney (110) direction in chimney (110) centre can be interpreted as flow concentration on chimney (110) wall.

Recovery thermal heat transfer capability of waste thermal energy recovery device (100) is in proportional ratio to fluid contact surface area perpendicular to the direction of fluid motion, thickness of material used in manufacture of heat recovery transfer surfaces (114) and thermal permeability coefficient of the material. In line of such scientific data, waste thermal energy recovery device (100) thermal recovery transfer surface material is selected from materials having high thermal permeability coefficient such as aluminium, copper and similar materials and among material as thin as possible in terms of material thickness.

The invention makes longer adequately the path taken by fluid inside waste thermal energy recovery device (100) by scanning fluid inner wall during operation period without negative impact of flow rate by help of selecting inner transfer chamber (141) diameter and height in a manner to maximize efficiency. Motion of fluid in inner transfer chamber (141) being in vortex turbulence flow characteristic enables making longer the path taken by fluid during heat transfer time. Particularly, it provides heat transfer with all surfaces including inner and outer surfaces.

Figure 3:
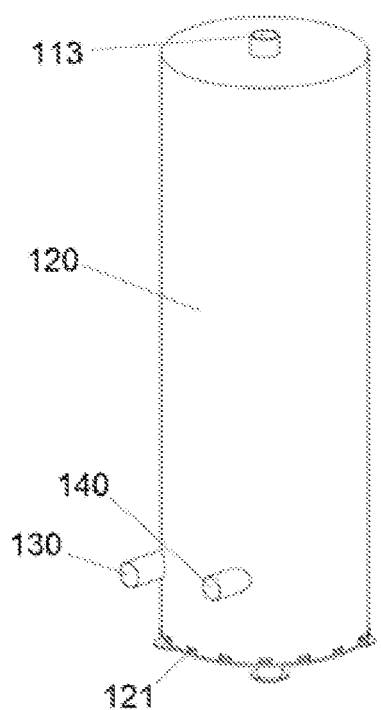
FIG. 3 is an outer schematic general view of waste thermal energy recovery device.

Waste thermal energy recovery device (100) shown in FIG. 3 and developed for enhancement of energy efficiency, reduction of energy input, and therefore fuel oil consumption by means of recovery of thermal energy waste flue gasses occurring after burning fossil fuel oil and processing thereof or waste air flow containing dry or water evaporation having heat capacity and in waste environment air acclimatized before after discharge during air freshing operation at acclimatization plants by means of waste thermal recovery device developed hereunder, and is applied to waste heat recovery inlet (140) having thermal energy coming from discharge fan of machine and equipment where connected. Fluid is subjected to heat transfer operations inside waste thermal energy recovery device (100) and after thermal energy is absorbed, waste thermal energy recovery device (100) is discharged from waste thermal energy recovery device (100) chimney outlet (113). Waste thermal recovery operation is performed by means of fresh air entering from fresh air inlet channels (121) by vacuum effect created by machine and equipment discharge fan where waste thermal energy recovery device (100) is connected. Fresh air with thermal recovery reaches machine and equipment from heat recovery outlet (130) and thus energy consumption is reduced. Heat insulation layer (120) having also chimney outlet (113) thereon is the most outer layer and made from materials providing heat insulation features to prevent heat loss. Said heat insulation layer (120) has an air flow space with heat recovery outlet chamber (131) and thus directs all heat leakages to heat transfer chambers and functions as the latest layer of heat transfer by means of fresh air circulation entering from fresh air inlet channels (121) provided therein and is separated from ordinary heat insulation techniques with its dynamic functional embodiment in terms of keeping loss at minimum level.

Figure 4:
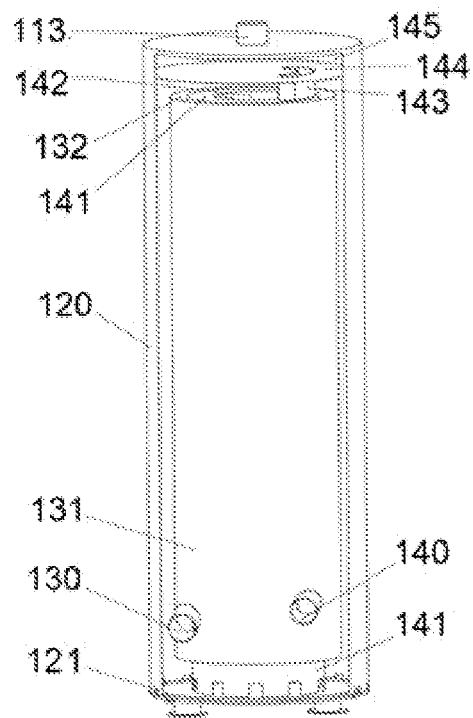
FIG. 4 is front schematic general view of insulation layer.

Fresh air entering from fresh air inlet channels (121) as shown in FIG. 4 takes weak heat leakages in bottom and proceeds in vertical direction along heat recovery outlet chamber (131) contacts last transfer chamber pass (143) and last transfer surface (144), after being exposed to primary heat transfer, a part of pre-conditioned air is directed to outer transfer inlet (132) while some part to inner transfer inlet (142) by contacting inner and outer surfaces of inner transfer chamber (141) in order to be exposed to secondary heat transfer. Said heat recovery outlet chamber (131) occurs firstly on both inner and outer surfaces of inner transfer chamber (141) and thereupon collects heat transfers occurring an all surfaces and transmits from heat recovery outlet (130) and thus plays a key role in waste heat recovery operation. Heat recovery outlet chamber (131) material selected from material having heat permeability and thickness provides transfer of only intended part of recovery energy towards heat insulation layer (120). Most part of recovered energy remains inside heat recovery outlet chamber (131). Said last transfer chamber pass (143) functions as a whole together with last transfer chamber (145) and last transfer surface (144) and thus enables recovery from waste exhaust fluid by heat transfer and provides supply of waste exhaust fluid to last transfer chamber (145) for heat recovery again. Said last transfer surface (144) enables heat transfer lastly before leaving of waste exhaust fluid from chimney (110) and provides contribution to preliminary heat conditioning before entrance of inlet fresh air into inner transfer inlet (142) and outer transfer inlet (132). Fluid reaching inner transfer chamber (141) from heat recovery inlet (140) is subjected to heat transfer towards last transfer chamber (145) by means of inner transfer chamber fluid directing spiral helix (148) along inner transfer chamber (141) and proceeds simultaneously with fresh air circulation. Said inner transfer chamber fluid directing spiral helix (148) guarantees helical turbulence nature movement of fluid inside inner transfer chamber (141) and scan of entire heat recovery transfer surfaces (114). After completing its path in inner transfer chamber (141) the fluid passes through last transfer surface (144) by means of last transfer chamber pass (143) and finally through last transfer chamber (145) in order to transfer a part of thermal energy into fresh air before waste discharging, and proceeds towards chimney outlet (113). Said last transfer chamber (145) functions as waste exhaust fluid containing barrier between heat insulation layer (120) and inner transfer chamber (141) and heat recovery outlet chamber (131) and thus provides contribution to heat transfer and heat insulation. Contribution to heat transfer is provided by last transfer surface (144).

Figure 5:
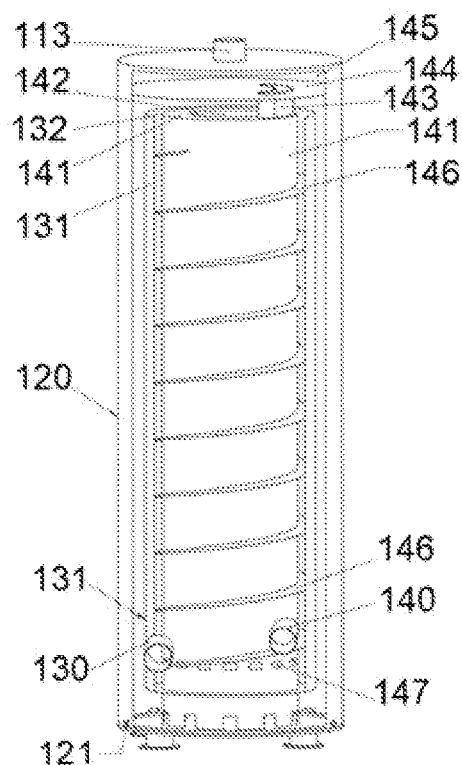
FIG. 5 is front schematic general view of outer insulation layer and heat recovery outlet chamber.

Air entering outer transfer inlet (132) as shown in FIG. 5 is exposed to heat transfer occurring on outer surface of inner transfer chamber (141) by means of outer transfer chamber fluid directing spiral helix (146) between heat recovery outlet chamber (131) and inner transfer chamber (141) and then proceeds to heat recovery outlet (130). Said outer transfer chamber fluid directing spiral helix (146) guarantees making longer the path to be taken by help of helical turbulence movement of fresh air in heat transfer process and scanning of all transfer outer surface of inner transfer chamber (141). This case increases recovered energy efficiency. Other air part entering inner transfer inlet (142) is exposed to heat transfer occurring on inner surface of inner transfer chamber (141) along inner transfer inlet (142) and then passes through inner transfer outlet channels (147) and mixes with air coming from outer transfer inlet (132) and reaches heat recovery outlet (130). Said inner transfer outlet channels (147) provides supply of fresh air proceeded from inner transfer inlet (142) and exposed to heat transfer, into heat recovery outlet chamber (131) and enables recovery from inner surface of inner transfer chamber (141).

Figure 6:
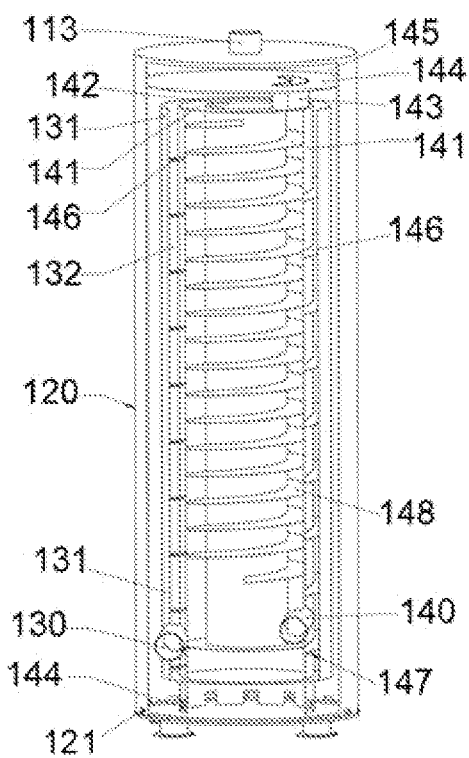
FIG. 6 is front schematic general view of outer insulation layer, heat recovery outlet chamber and inner transfer chamber outer surface.

Fluid having thermal energy applied to heat recovery inlet (140) as shown in FIG. 6 is directed to scan inner transfer chamber (141) by inner transfer chamber fluid directing spiral helix (148) and moves along inner transfer chamber (141) in vertical axis. Fluid is exposed to heat transfer towards heat recovery outlet chamber (131) from inner surface of inner transfer chamber (141) and outer surface thereof along path inside inner transfer chamber (141) and transfer of the energy into fresh air is provided.

Figure 7:
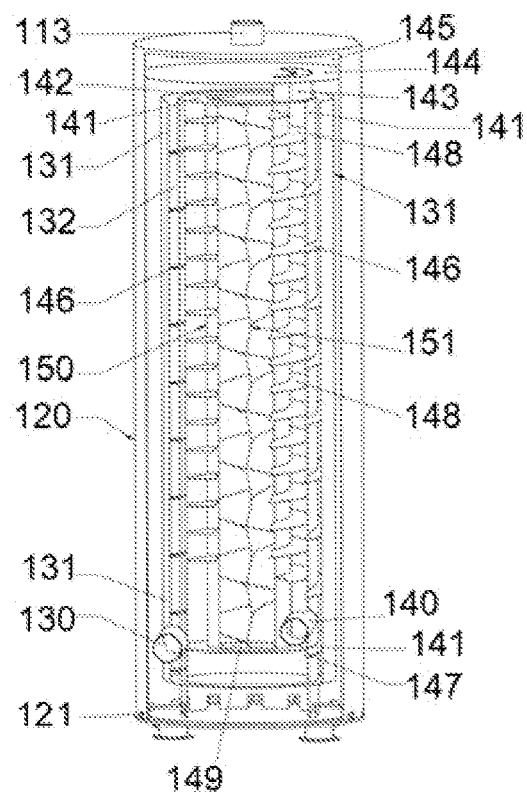
FIG. 7 is front schematic general view of outer insulation layer, heat recovery outlet chamber and inner transfer chamber inner surface.

As shown in FIG. 7, fresh air entering from inner transfer inlet (142) exposed to pre-thermal conditioning is exposed to heat transfer from inner transfer chamber inner layer (150) by helical effect of extended path by means of inner transfer fluid directing spiral helix (151) and respectively passes through inner transfer outlet (149), inner transfer outlet channels (147) and heat recovery outlet chamber (131) and reaches heat recovery outlet (130) and thus completes circuit of heat recovery function. Said inner transfer fluid directing spiral helix (151) guarantees extending the path by helical motion of air and scanning of entire transfer surface while making heat transfer to a part of fresh air pre-thermal conditioned from inner surface of inner transfer chamber (141). Said inner transfer outlet (149) provides supply of fresh air proceeded from inner transfer inlet (142) and exposed to heat transfer, into heat recovery outlet chamber (131) and enables recovery from inner surface of inner transfer chamber (141).

Figure 8:
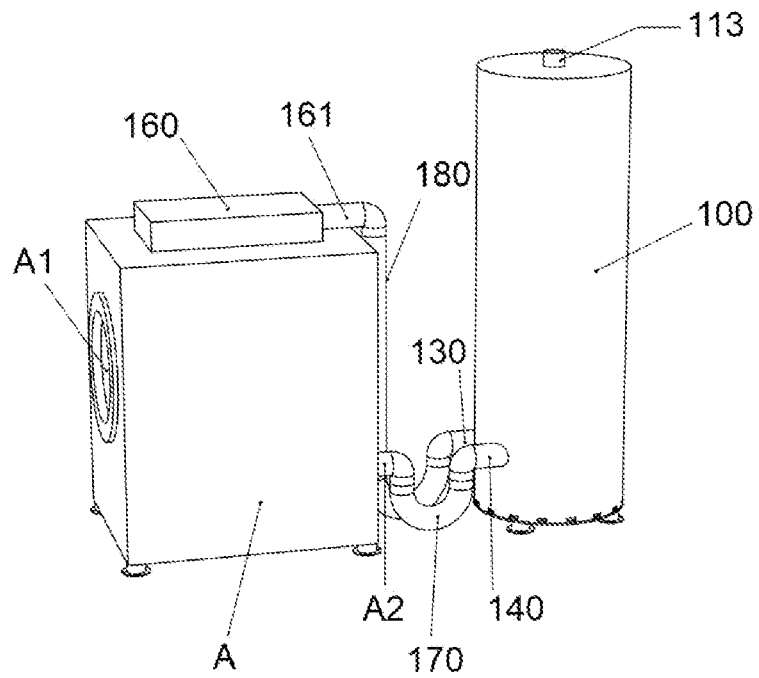
FIG. 8 is a schematic general view of use of waste thermal energy recovery device in textile drying machine as a preferred application.
Figure 9:
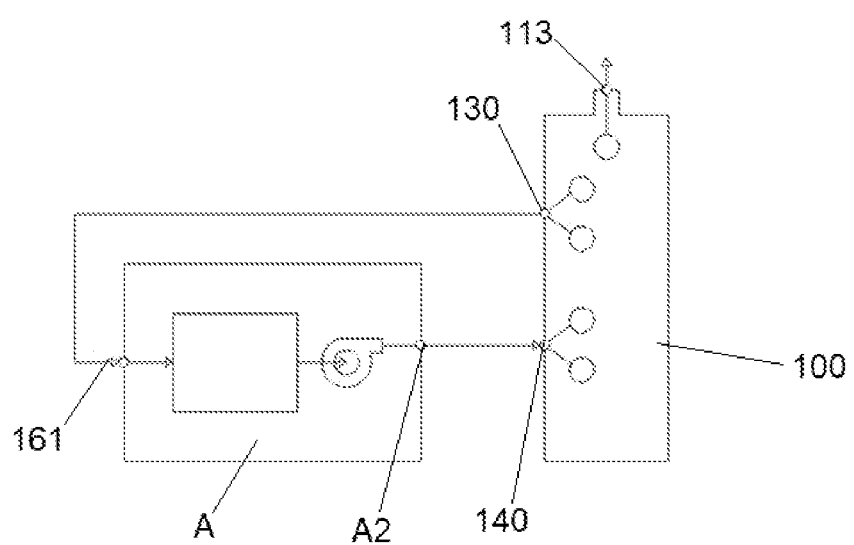
FIG. 9 is a process chart of use of waste thermal energy recovery device in textile drying machine as a preferred application.

As shown in FIG. 8, in a preferred embodiment of the invention, waste thermal energy recovery device (100) is used together with textile drying machine (A). It is loaded into textile drying machine (A) by opening textile product loading door (A1) and inserting therein. Fresh air inlet space of textile drying machine (A) is covered with adapter cap (160) of high heat insulation and respectively, waste thermal energy recovery device (100) is connected to waste thermal energy recovery device (100) heat recovery outlet (130) by means of adapter cap inlet pipe (161) and high heat insulation inlet connection hose (180). Similarly, textile drying machine (A) exhaust outlet (A2) through which hot drying air containing water evaporation is discharged is connected to heat recovery inlet (140) of waste thermal recovery device (100) by means of also high heat insulation outlet connection hose (170). During drying operation, internal drying fan provided on textile drying machine (A) receives recovery fresh air pre-heated by recovery energy by help of adapter cap (160) from fresh air inlet space of drying machine via waste thermal energy recovery device (100). Said adapter cap (160) provides adaptation of waste thermal energy recovery device (100) heat recovery outlet (130) to machine and equipment and insulates machine and equipment fresh air inlets from outer environment thermally and provides that fresh air inlet is made from waste thermal energy recovery device (100) heat recovery outlet (130). After fresh air entering textile drying machine (A) is heated by energy source in the machine, it is supplied to drying boiler where textile products are located. Water contained in textile products in the drying boiler continues its existence in drying air as water evaporation. Hot drying air having water evaporation passes through drying fan and respectively exhaust outlet (A2) where drying air is discharged, outlet connection hose (170) and reaches waste thermal energy recovery device (100) via heat recovery inlet (140). Thermal energy in the drying air is transferred to inlet fresh air inside waste thermal energy recovery device (100). As fresh air entering textile drying machine (A) is preheated by recovery energy, textile drying machine (A) uses less energy input to obtain drying air at drying temperature and thus energy saving is provided. If energy saving is indented to be reflected into production activities in respect to drying time to maintain drying temperature fixed then while energy input is increased, drying air flow rate is also to be increased to maintain drying temperature fixed. In this way, upon increase in drying air flow rate at fixed drying temperature, drying is achieved in much shorter time period. Requirement to maintain drying temperature fixed is because of protecting textile products from damages arising out of temperature. Energy recovery control system is needed to optimize energy recovery of waste thermal recovery device (100) and manage effects of energy recovering on drying process time period. The control system shown in FIG. 9 controls process fan speed, air flow rate and energy input in order to provide shortening time period of process by maintaining process temperature of recovered energy or reflection into production activities preferably as extendable process time period as a function of temperature of chimney (110) focused on maximization of energy recovery. Energy recovery control system processes humidity and temperature measurement values taken from various points of waste thermal energy recovery device (100) and offers users flexibility for management of effect of energy recovery function on production activities.

Waste fluid having thermal energy of which energy is to be recovered is supplied into inner transfer chamber (141) through heat recovery inlet (140) in a manner to apply between two cylinders into inner transfer chamber (141) of high heat permeability in two cylinders interconnected by internal fan of machine or equipment where waste thermal energy recovery device (100) is connected. Waste fluid moves in a manner exposing outer and internal surfaces of inner transfer chamber (141) to heat transfer by helical movement with cylindrical structure of inner transfer chamber (141). When helical movement inside inner transfer chamber (141) of waste fluid is compared to a normal chimney, it causes extension of the path taken and therefore increase of heat transfer efficiency. Inner transfer chamber fluid directing spiral helix (148) located between outer and internal surfaces of inner transfer chamber (141) guarantees helical turbulence nature of movement of waste fluid and scanning of entire heat recovery transfer surfaces (114). Inner transfer chamber (141) is subject to heat transfer with all surfaces and it is exposed to heat transfer in last transfer chamber pass (143) and thus reaches last transfer chamber (145). Last transfer chamber (145) causes exposure to heat transfer from last transfer surface (144) lastly before discharge of waste fluid from chimney outlet (113) and forms barrier between outer heat insulation layer (120) and heat recovery transfer surfaces (114) and thus provides increase in heat insulation. Waste thermal energy recovery device (100) adapter cap (160) covers fresh air inlet vacuumed with fresh air by internal fan of machine or equipment and provides thermal and physical insulation from environment and enables connection of machine or equipment with waste thermal recovery device (100). Said adapter cap (160) takes fresh air needed by machine or equipment not from environment but in pre-conditioned form from waste thermal energy recovery device (100).

Simultaneously with journey of waste fluid starting with entering heat recovery inlet (140) by internal vacuum effect of machine and equipment and continuing with inner transfer chamber (141) and ending from chimney outlet (113), fresh air flow transferred onto recovery energy occurs. Fresh air enters from fresh air inlet channels (121) on heat insulation layer (120) and collects all heat leakages and proceeds along heat recovery outlet chamber (131) and after exposed to heat transfer by last transfer chamber pass (143) and last transfer surface (144), a part thereof from inner transfer inlet (142) and another from outer transfer inlet (132) continues to be exposed to heat transfer by inner transfer chamber (141) internal and outer surfaces. Outer transfer chamber fluid directing spiral helix (146) guarantees scan of transfer surface by helical movement of fresh air entering outer transfer inlet (132) along outer surface of inner transfer chamber (141) and extension of flow path. Inner transfer fluid directing spiral helix (151) guarantees scan of transfer surface by helical movement of fresh air entering inner transfer inlet (142) along inner surface of inner transfer chamber (141) and extension of flow path. Fresh air entering from outer transfer inlet (132) and inner transfer inlet (142) and proceeding in parallel is exposed to heat transfer and proceeds towards heat recovery outlet (130) inside heat recovery outlet chamber (131). Fresh air entering from outer transfer inlet (132) and air directly entering from inner transfer inlet (142) passes through inner transfer outlet (149) and inner transfer outlet channels (147) respectively and reaches heat recovery outlet (130). Air reaching heat recovery outlet (130) with pre thermal load in a waste recovery passes through inlet connection hose (180), adapter cap inlet pipe (161) and adapter cap (160) respectively and thus energy recovery is achieved.

In a preferred embodiment of the invention, recovery air is purified in waste thermal energy recovery device (100). A humidity discharge and filter is provided for removal of humidity in the air purified at said waste thermal energy recovery device (100) from the system. Humidity discharge and filter can be provided in waste thermal energy recovery device (100) at the same time together or separately subject to current need and nature of recovery air.

In a preferred embodiment of the invention, condenser outlet is added to waste thermal energy recovery device (100) for discharge of humidity in case of occurrence.

In another preferred embodiment of the invention, on site recovery is provided by adding exchanger into converse in some steam machines in adapter cap inlet pipe (161) part.

In another preferred embodiment of the invention, chimney (110) temperature process period is extended to increase drying efficiency.

In another preferred embodiment of the invention, additional fan is added in waste thermal energy recovery device (100).

In another preferred embodiment of the invention, inner transfer fluid directing spiral helix (151) is formed in helical or another geometric form achieving same purpose in order to provide scan of entire transfer surface along inner surface of inner transfer chamber (141) by fresh air entering through inner transfer inlet (142) and extension of flow path. On the other hand, in cases where inner transfer fluid directing spiral helix (151) is not used, heat recovery still can be provided.

The invention claimed is:

1. A waste thermal energy recovery device optimizing machine, equipment and system efficiency by reducing energy release to environment in order to provide waste thermal energy recovery to steam boilers performing operations such as heating, drying, fluid phase change by energy transformation, fresh fruit-vegetable drying machines, air conditioning chambers performing air fresh operations, laundry drying machines, textile drying machines, machines and systems performing air or derivative gas and heat release to environment as a result of process, wherein the waste thermal energy recovery device comprises:
- a most outer heat insulation layer for directing all heat leakages to heat transfer chambers and functioning as a last layer of heat transfer by circulation of fresh air entering through fresh air inlet channels therein and having an air flow space with a heat recovery outlet chamber to keep loss at minimum level, made from materials to provide heat insulation to prevent heat loss, also having a chimney outlet;
- a heat recovery outlet supplying fresh air with heat recovered to machine and equipment for reducing energy consumption;
- a waste heat recovery inlet for being applied waste fluid which has thermal energy coming from a discharge fan of machine and equipment where the waste thermal recovery device is connected;
- adapter cap providing adaptation of the waste thermal energy recovery device to the heat recovery outlet to machine and equipment, and insulating machine and equipment fresh air inlets from outer environment thermally and providing that fresh air inlet is made from said heat recovery outlet of said waste thermal energy recovery device.

2. The waste thermal energy recovery device according to claim 1, wherein said waste thermal energy recovery device comprises an inner transfer chamber performing heat transfer on all surfaces including inner and outer surfaces in adequate value of diameter and height to maximize efficiency for extension of path taken during heat transmission time within the waste thermal energy recovery device by scanning inner wall of fluid during worktime without negatively affecting flow rate.

3. The waste thermal energy recovery device according to claim 1, wherein said waste thermal energy recovery device comprises a last transfer chamber pass enabling recovery from waste exhaust fluid by heat transfer and providing supply of waste exhaust fluid to the last transfer chamber for heat recovery again by functioning as a whole together with the last transfer chamber and a last transfer surface.

4. The waste thermal energy recovery device according to claim 1, wherein said waste thermal energy recovery device comprises a last transfer surface providing contribution to preliminary heat conditioning before entrance of inlet fresh air into an inner transfer inlet and an outer transfer inlet by enabling heat transfer lastly before leaving of waste exhaust fluid from a chimney outlet.

5. The waste thermal energy recovery device according to claim 1, wherein said waste thermal energy recovery device comprises a last transfer chamber providing contribution to heat transfer and heat insulation by functioning as waste exhaust fluid containing barrier, between a heat insulation layer and an inner transfer chamber and a heat recovery outlet chamber, while fluid reaching said inner transfer chamber from a heat recovery inlet, exposed to heat transfer via inner transfer chamber fluid directing a spiral helix, proceeding simultaneously with fresh air circulation along the inner transfer chamber.

6. The waste thermal energy recovery device according to claim 1, wherein said waste thermal energy recovery device comprises an outer transfer chamber fluid directing spiral helix guaranteeing extension of the path, for increasing recovered energy efficiency, to be taken by help of helical turbulence movement of fresh air in heat transfer process and scanning of all transfer outer surface of the inner transfer chamber, wherein air entering an outer transfer inlet is exposed to heat transfer occurring on outer surface of said inner transfer chamber and proceeded towards the heat recovery outlet, and located between the heat recovery outlet chamber and the inner transfer chamber.

7. The waste thermal energy recovery device according to claim 1, wherein said waste thermal energy recovery device comprises an inner transfer outlet channels providing supply of fresh air entering from an inner transfer inlet and proceeded by being exposed to heat transfer, into the heat recovery outlet chamber for enabling recovery from inner surface of the inner transfer chamber too.

8. The waste thermal energy recovery device according to claim 1, wherein said waste thermal energy recovery device comprises an inner transfer chamber fluid directing spiral helix guaranteeing helical turbulence movement of fluid inside the inner transfer chamber and scanning of entire heat recovery transfer surfaces.

9. The waste thermal energy recovery device according to claim 1, wherein said waste thermal energy recovery device comprises an inner transfer outlet supplying fresh air entering from the inner transfer inlet and proceeded by being exposed to heat transfer into the heat recovery outlet chamber for enabling recovery from inner surface of the inner transfer chamber.

10. The waste thermal energy recovery device according to claim 1, wherein said waste thermal energy recovery device comprises an inner transfer fluid directing spiral helix (151) extending the path by helical motion of air and scanning of entire transfer surface while heat transfer to a part of fresh air pre-thermal conditioned from inner surface of the inner transfer chamber.

11. The waste thermal energy recovery device according to claim 1, wherein said waste thermal energy recovery device comprises a control system processing humidity and temperature measurement values taken from various points of the waste thermal energy recovery device and offering users flexibility for management of effect of energy recovery function on production activities, controlling process fan speed, air flow rate and energy input in order to provide shortening time period of process by maintaining process temperature of recovered energy or reflection into production activities preferably as extendable process time period as a function of temperature of chimney focused on maximization of energy recovery.

12. The waste thermal energy recovery device according to claim 1, wherein said waste thermal energy recovery device comprises a fluid directing spiral helix guiding thermal energy carrying fluid, transferred via a chimney fan passing through a chimney inlet, for creating a turbulence flow of circular characteristics inside a chimney, in a tangential way to chimney inner surface.

13. Working principle of a waste thermal energy recovery device to provide energy efficiency, reduction of energy input, and therefore fuel oil consumption by means of recovery of thermal energy waste flue gasses occurring after burning fossil fuel oil and processing thereof or waste air flow containing dry or water evaporation having heat capacity and in waste environment air acclimatized before after discharge during air freshing operation at acclimatization plants, and wherein the working principle of the waste thermal energy recovery device comprises the process steps of:

fresh air entering from the fresh air inlet channels taking weak heat leakages in bottom and proceeds in vertical direction along the heat recovery outlet chamber contacts the last transfer chamber pass and the last transfer surface, after being exposed to primary heat transfer, directing a part of pre-conditioned air to the outer transfer inlet while some part to the inner transfer inlet by contacting inner and outer surfaces of the inner transfer chamber in order to be exposed to secondary heat transfer;

the heat recovery outlet chamber collecting heat transfers occurring on all surfaces of the inner transfer chamber and transmitting from the heat recovery outlet;

the last transfer chamber pass functioning together with the last transfer chamber and the last transfer surface and enabling recovery from waste exhaust fluid by heat transfer and supply of waste exhaust fluid to said last transfer chamber for heat recovery;

exposing fluid reaching the inner transfer chamber from the heat recovery inlet to heat transfer towards said last transfer chamber by means of the inner transfer chamber fluid directing spiral helix along the inner transfer chamber and proceeding simultaneously with fresh air circulation;

exposing air entering the outer transfer inlet to heat transfer occurring on outer surface of the inner transfer chamber by means of 0 outer transfer chamber fluid directing spiral helix between the heat recovery outlet chamber and the inner transfer chamber and then proceeds to the heat recovery outlet;

directing fluid having thermal energy applied to the heat recovery inlet to scan the inner transfer chamber by the inner transfer chamber fluid directing spiral helix and moves along the inner transfer chamber in vertical axis; and exposing fresh air entering from the inner transfer inlet exposed to pre-thermal conditioning to heat transfer from an inner transfer chamber inner layer by the helical effect of extended path by means of the inner transfer fluid directing spiral helix and respectively passing through the inner transfer outlet, inner transfer outlet channels and the heat recovery outlet chamber and reaching the heat recovery outlet and thus completing circuit of heat recovery function.

14. The working principle of a waste thermal energy recovery device according to claim 13, wherein the working principle of a waste thermal energy recovery device comprises a process step of guiding thermal energy carrying fluid, transferred via the chimney fan passing through the chimney inlet, for creating a turbulence flow of circular characteristics inside the chimney, in a tangential way to chimney inner surface by help of a fluid directing spiral helix.

15. The working principle of a waste thermal energy recovery device according to claim 13, wherein the working principle of a waste thermal energy recovery device comprises a process step of directing all heat leakages of a heat insulation layer to heat transfer chambers and circulating fresh air entering from the fresh air inlet channels therein.

16. The working principle of a waste thermal energy recovery device according to claim 13, wherein the working principle of a waste thermal energy recovery device comprises a process step of proceeding the fluid, after completion of its path in the inner transfer chamber, towards the chimney outlet, through the last transfer surface by means of a last transfer chamber pass and finally through the last transfer chamber in order to transfer a part of thermal energy into fresh air before waste discharging.

17. The working principle of a waste thermal energy recovery device according to claim 13, wherein the working principle of a waste thermal energy recovery device comprises a process step of exposing other air part entering the inner transfer inlet to heat transfer occurring on an inner surface of the inner transfer chamber along the inner transfer inlet and then passing through the inner transfer outlet channels and mixing with air coming from the outer transfer inlet and reaching the heat recovery outlet.

18. The working principle of a waste thermal energy recovery device according to claim 13, wherein the working principle of a waste thermal energy recovery device comprises a process step of exposing fluid to heat transfer towards the heat recovery outlet chamber from the inner surface of the inner transfer chamber and outer surface thereof along path inside said inner transfer chamber and transfer of the energy into fresh air.

* * * * *